United States Patent
Howard, Jr. et al.

(10) Patent No.: US 6,558,844 B2
(45) Date of Patent: May 6, 2003

(54) STABILIZED SPINEL BATTERY CATHODE MATERIAL AND METHODS

(76) Inventors: Wilmont F. Howard, Jr., 648 Wildmeadow Dr., Edmond, OK (US) 73003; Stephen W. Sheargold, 2513 Pawnee Crossing, Edmond, OK (US) 73034; Phillip M. Story, 13225 W. Memorial Rd., Yukon, OK (US) 73099; Robert L. Peterson, 30th N. 2nd East, Soda Springs, ID (US) 83276

(*) Notice: Subject to any disclaimer, the term of this patent is extended or adjusted under 35 U.S.C. 154(b) by 183 days.

(21) Appl. No.: 09/774,441

(22) Filed: Jan. 31, 2001

(65) Prior Publication Data

US 2002/0141937 A1 Oct. 3, 2002

(51) Int. Cl.[7] .................................................. H01M 4/48
(52) U.S. Cl. ...................... 429/231.1; 429/224; 423/599
(58) Field of Search ............................. 429/231.1, 224; 423/599

(56) References Cited

U.S. PATENT DOCUMENTS

| | | |
|---|---|---|
| 5,429,890 A | 7/1995 | Pynenburg et al. ......... 429/192 |
| 5,443,929 A | 8/1995 | Yamamoto et al. ......... 429/224 |
| 5,700,597 A | 12/1997 | Zhong et al. ............... 429/218 |
| 5,705,291 A | 1/1998 | Amatucci et al. ........... 429/137 |
| 5,733,685 A | 3/1998 | Wang .......................... 429/224 |
| 5,763,120 A | 6/1998 | Saidi et al. .................. 429/224 |
| 5,770,018 A | 6/1998 | Saidi ...................... 204/157.15 |
| 5,783,328 A | 7/1998 | Wang .......................... 429/137 |
| 5,869,207 A | 2/1999 | Saidi et al. .................. 429/224 |
| 5,976,489 A | 11/1999 | Saidi et al. .................. 423/599 |
| 6,022,641 A | 2/2000 | Endo et al. .................. 429/232 |
| 6,136,475 A | 10/2000 | Tsutsumi et al. ....... 429/231.95 |
| 6,183,718 B1 * | 2/2001 | Barker et al. ............... 423/599 |

FOREIGN PATENT DOCUMENTS

| | | |
|---|---|---|
| JP | 08162114 | 6/1996 |
| JP | 8-162114 | 6/1996 |
| JP | 10162825 | 6/1998 |
| WO | WO 98/26469 | 6/1998 |
| WO | WO 00/49668 | 8/2000 |
| WO | WO 00/69006 | 11/2000 |
| WO | WO 01/13443 | 2/2001 |

OTHER PUBLICATIONS

G.G. Amatucci et al. "Surface treatments of $Li_{1+x}Mn_{2-x}O_4$ spinels for improved elevated temperature performance," Solid State Ionics 104 (1997) pp. 13–35.

* cited by examiner

*Primary Examiner*—Laura Weiner
(74) *Attorney, Agent, or Firm*—McAfee & Taft; C. Clark Dougherty, Jr.

(57) ABSTRACT

Improved stabilized spinel battery cathode material and methods of treating particles of spinel battery cathode material to produce a protective coating of battery-inactive lithium metal oxide on the particles are provided. The methods basically comprise mixing the spinel particles with a particulate reactant selected from a lithium salt, a lithium metal oxide or a mixture of a lithium salt and a metal oxide and then heating the resultant particulate mixture for a time and temperature to react the particulate reactant with the spinel particles whereby a protective coating of lithium metal oxide is formed on the spinel particles and the lithium content of the spinel adjacent to the coating is increased a limited amount.

24 Claims, 1 Drawing Sheet

Lattice shrinkage of coated spinel annealed at 350°C and 500°C

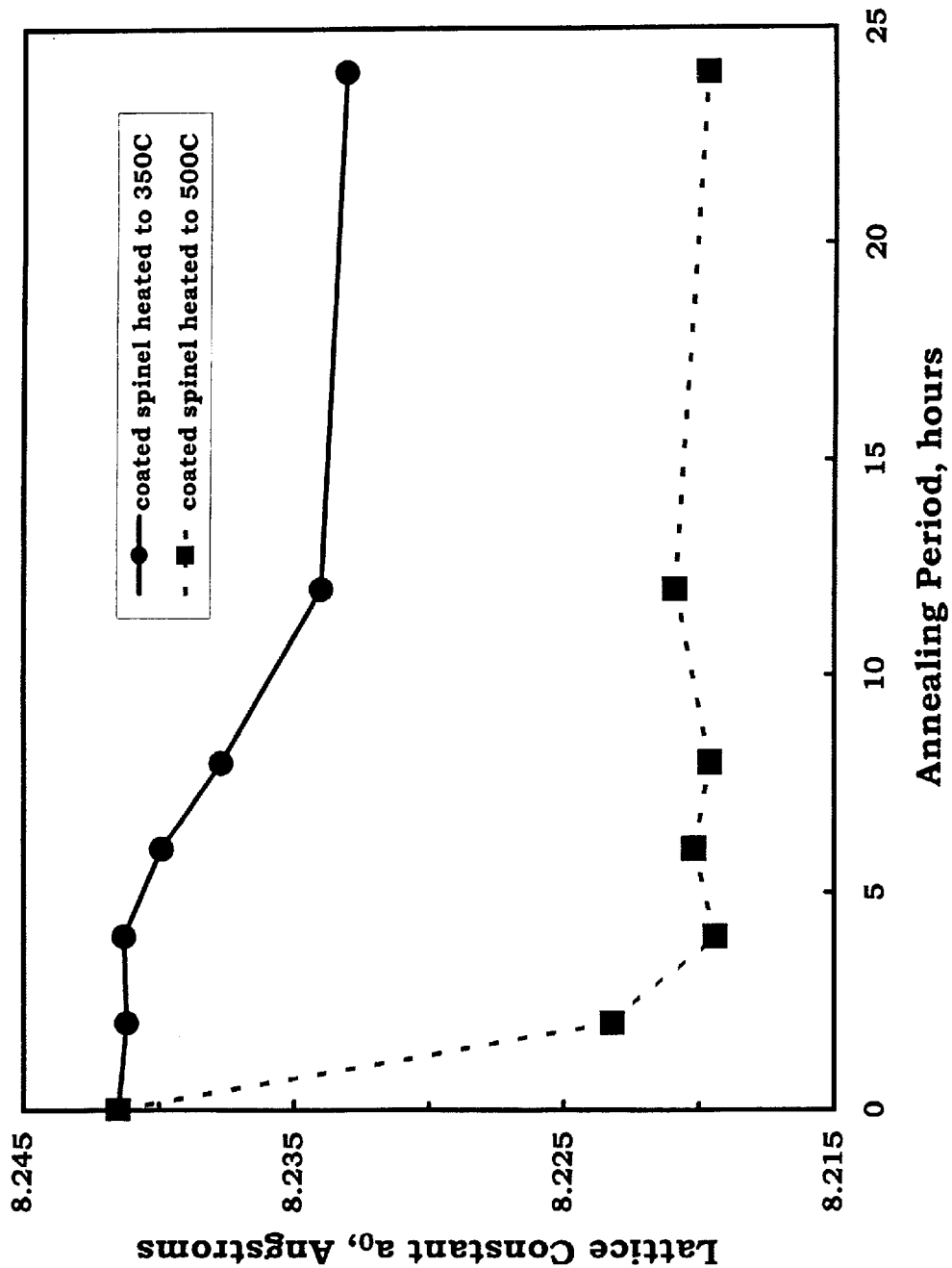

STABILIZED SPINEL BATTERY CATHODE MATERIAL AND METHODS

BACKGROUND OF THE INVENTION

1. Field of the Invention

This invention relates to stabilized lithium manganese oxide spinel battery cathode material, and to improved methods of stabilizing the spinel against acid attack and the like.

2. Description of the Prior Art

Recently, there has been increased interest in using lithium manganese oxide having the formula $Li_{1+x}Mn_{2-x}O_4$ ($0.02 \leq x \leq 0.15$, unless stated otherwise), referred to in the art as spinel or LMO, as a cathode material in lithium-ion batteries. The advantages of using spinel instead of the more commonly used alternatives, i.e., $LiCoO_2$ or $Li(Co, Ni)O_2$, are well known. For example, spinel is less expensive, environmentally friendly and considerably safer during operation than the alternative materials. However, the use of spinel as battery cathode material has major drawbacks, i.e., the spinel exhibits a rapid loss in capacity when cycled or stored at temperatures above 45° C. and mineral acid impurities in batteries degrade the spinel and reduce its performance.

A variety of solutions to the problem of the rapid loss in capacity of spinel above 45° C. have been proposed by those skilled in the art. The solutions include the incorporation of additional lithium into the spinel lattice to form spinel of the formula $Li_{1+x}Mn_{2-x}O_4$ or substituting fluoride for some of the oxygen to yield spinel having the formula $Li_{1+x}Mn_{2-x}O_{4-z}F_z$ (see Amatucci et al., U.S. Pat. No. 5,674,645 and Sugiyama et al., U.S. Pat. No. 6,087,042). Another solution involves replacing a fraction of the Mn with a stabilizing metal (M) such as Cr, Ni, Co, Al and the like to form $Li_{1+x}M_yMn_{2-x-y}O_4$ (Dahn et al., U.S. Pat. No. 5,900,385) wherein x is greater than 0 but less than 1 and y is less than or equal to 1.

Another proposed solution involves the formation of a protective coating on the particles of spinel to prevent corrosion or dissolution of the spinel. The formation of a protective coating on spinel is disclosed in U.S. Pat. No. 5,443,929 issued to Yamamoto et al. on Aug. 22, 1995 wherein a lithium-deficient spinel ($Li_{1+x}Mn_2O_4$) encapsulated by lithium manganite ($Li_2MnO_3$) is disclosed. In accordance with the teachings of the patent, LiOH powder is added to stoichiometric spinel at various ratios from 0.02:1 to 1.2:1 and the mixture is heated in air at 200° C. to 1000° C., preferably at 375° C., for 20 hours. The final product is a dual phase material that has acid resistance and enhanced stability during high temperature battery operation, but it suffers from the disadvantage that the maximum capacity is substantially reduced.

U.S. Pat. No. 5,733,685 issued to Wang on Mar. 31, 1998 and U.S. Pat. No. 5,783,328 also issued to Wang on Jul. 21, 1998 disclose that improved spinel cathode material stability is obtained by protecting the spinel particles with a thin layer of lithium carbonate ($Li_2CO_3$). The coating is accomplished by combining a solution of LiOH with spinel having the formula $Li_{1+x}Mn_{2-x}O_4$ wherein x is greater or equal to 0 and less than or equal to 0.1. After the mixture is dried, it is heated to a temperature of from 270° C. to 300° C. for 20 hours in the presence of carbon dioxide. While the resulting layer of $Li_2CO_3$ on the spinel makes it more robust than unprotected spinels at temperatures above 45° C., the coated spinel tends to out-gas during battery use which causes the battery case to swell or vent, etc.

U.S. Pat. No. 5,705,291 issued to Amatucci et al. on Jan. 6, 1998 discloses that a glassy coating of LiOH mixed with $B_2O_3$ and other additives retards spinel capacity loss, and U.S. Pat. No. 6,022,641 issued to Endo et al. on Feb. 8, 2000 discloses the benefits of mixing $Li_2CO_3$ or $Na_2CO_3$ with spinel in an amount of from 0.5% to 20% by weight of the spinel to improve cycle performance. Further, Oesten et al. (WO 00/70694—Nov. 23, 2000) protect all lithium metal oxide cathode materials by coating the active particles with an organometallic species and then pyrolyzing to leave a metal oxide outer layer.

It is also possible to coat lithium manganese oxide spinels with other battery-active cathode materials having the general formula $LiMO_x$ wherein M is a transition metal (Iguchi et al., Japanese Kokai HEI 8[1996]-162114 and Hwang et al., U.S. Pat. No. 5,928,622). In this approach, thermally decomposable Li and M salts (or oxides) in the appropriate Li:M ratio are blended with the spinel and reacted at temperatures up to 750° C. This results in particles of the original spinel having an acid resistant $LiMO_x$-rich outer shell.

The surface treatments of spinel battery cathode material of the types described above inevitably result in a decrease of the maximum reversible discharge capacity of the spinel. In addition to lowered capacity caused by the added mass of electrochemically inert species, Gummow et al. in *Solid State Ionics*, 69, 59 (1994) showed that the inclusion of non-stoichiometric Li in $Li_{1+x}Mn_{2-x}O_4$ will decrease the discharge capacity of the resulting material by a factor of (1–3x). The advantage of such treatments is that they slow the loss of discharge capacity (referred to in the art as fade) during repeated charge/discharge cycles. The battery industry's yardstick of useful battery life dictates battery replacement when the battery has lost 20% of its initial discharge capacity. The protective coatings extend the number of useful cycles that the spinel cathode material can provide, but as mentioned, the maximum reversible discharge capacity of the spinel is significantly decreased.

The prior art discloses providing spinel battery cathode material with a coating of an acid resistant or acid-scavenging compound. Mineral acids present as impurities in lithium ion batteries attack $Li_{1+x}Mn_{2-x}O_4$ spinel cathode material extracting lithium and up to 25% of the manganese leaving the spinel unable to perform satisfactorily. The impurity acids are generated in lithium-ion batteries by the hydrolysis of $LiPF_6$ electrolyte salt, by trace moisture or by the oxidation of organic carbonate electrolyte solvents at the high voltage end of the battery cycle. While the protection afforded by the above described prior art coatings prevent or reduce the problems associated with acid attack at temperatures below 45° C. in batteries for mobile devices such as cell phones, laptop computers, photographic equipment and the like, the prior art coatings significantly reduce the maximum reversible discharge capacity of the spinel cathode material.

Thus, there is a need for an improved method of treating particles of spinel battery cathode material to produce a protective coating on the spinel particles which protects the spinel from acid attack, reduces the loss of maximum discharge capacity only a minimal amount and substantially improves the fade rate during charge/discharge cycles.

SUMMARY OF THE INVENTION

The present invention provides improved stabilized particulate $Li_{1+x}Mn_{2-x}O_4$ spinel battery cathode material and methods of treating particles of $Li_{1+x}Mn_{2-x}O_4$ spinel to produce a protective coating of a battery inactive, ceramic like lithium metal oxide on the particles. The coating resists acid attack, substantially improves the capacity fade of the material and reduces the maximum discharge capacity of the material only minimally. The methods of the invention are basically comprised of the following steps. The spinel particles are mixed with a particulate reactant selected from a lithium salt, a lithium metal oxide or a mixture of a lithium salt and a metal oxide. Thereafter, the resulting particulate mixture is heated for a time in the range of from about 15 minutes to about 20 hours at a temperature in the range of from about 350° C. to about 850° C. During the heating step, the particulate lithium salt, lithium metal oxide or mixture of the lithium salt and a metal oxide reacts with the spinel particles whereby a protective coating of battery-inactive lithium metal oxide is formed on the spinel particles and the lithium content of the spinel particles adjacent to the coating is increased a limited amount as represented by the formula $Li_{1+x}Mn_{2-x}O_4$ wherein x is less than 0.2.

The coated spinel particles are preferably cooled to a temperature below 200° C. in a time period in the range of from about 10 to about 120 minutes. Thereafter, the spinel particles are cleaned and sized by removing agglomerates and metallic particles while passing the particles through a magnetic trap and 150 mesh or smaller screens.

It is, therefore, a general object of the present invention to provide improved stabilized spinel battery cathode material and methods of treating spinel particles to produce a protective coating of lithium metal oxide on the particles without substantially reducing the maximum discharge capacity of the resulting material while improving the capacity fade of the material.

Other and further objects, features and advantages of the present invention will be readily apparent to those skilled in the art upon a reading of the description of preferred embodiments which follows.

BRIEF DESCRIPTION OF THE DRAWING

The drawing is a graph showing the lattice shrinkage of coated spinel annealed at 350° C. and 500° C.

DESCRIPTION OF PREFERRED EMBODIMENTS

As mentioned above, the present invention provides an improved treated particulate spinel battery cathode material which includes a protective coating of battery-inactive lithium metal oxide on the spinel particles whereby the cathode material is acid resistant, has a maximum discharge capacity which is only minimally reduced and has a substantially improved fade rate during repeated charge/discharge cycles. The improved stabilized spinel battery cathode material is produced in accordance with this invention by treating particles of spinel having the formula $Li_{1+x}Mn_{2-x}O_4$ whereby protective coatings of lithium metal oxide are formed on the spinel particles. The treating method is basically comprised of the steps of: (a) mixing the spinel particles with a particulate lithium salt, lithium metal oxide or a mixture of the lithium salt and a metal oxide; and (b) heating the resulting particulate mixture for a time in the range of from about 15 minutes to about 20 hours at a temperature in the range of from about 350° C. to about 850° C. to thereby react the particulate lithium salt, lithium metal oxide or mixture of lithium salt and metal oxide with the spinel particles whereby protective coatings of battery inert lithium metal oxide are formed on the spinel particles and the lithium contents of the spinel particles adjacent to the coatings are increased limited amounts as represented by the formula $Li_{1+x}Mn_{2-x}O_4$ wherein x is less than 0.2.

The untreated $Li_{1+x}Mn_{2-x}O_4$ spinel can be of any desired particle size and there are no restrictions on the lithium or manganese content or crystal lattice size. Preferably, the spinel particles have an average size less than about 35 microns and about 100% passes through a 200 mesh screen.

Examples of the lithium salts that can be utilized for forming the coating on the spinel include, but are not limited to, lithium carbonate, lithium hydroxide, lithium nitrate, lithium salts of organic acids such as lithium acetate, lithium formate and lithium oxalate, and mixtures of such lithium salts. Of these, lithium carbonate is preferred.

Examples of lithium metal oxides that can be utilized include, but are not limited to, $Li_2MnO_3$, $LiScO_2$, $LiYO_2$, $Li_2ZrO_3$, $Li_2HfO_3$, $LiAlO_2$, $LiAl_5O_8$, $LiGaO_2$, $LiLaO_2$, $Li_2SiO_3$, $Li_4SiO_4$, $Li_2GeO_3$ and mixtures thereof.

Examples of metal oxides that can be utilized include, but are not limited to $Sc_2O_3$, $Y_2O_3$, $ZrO_2$, $HfO_2$, $Al_2O_3$, $Ga_2O_3$, $La_2O_3$, $SiO_2$, $GeO_3$ and mixtures thereof.

The lithium salt utilized generally has an average particle size of less than about 10 microns and about 100% passes through a 150 mesh screen. The lithium metal oxides utilized generally have an average particle size less than about 5 microns, and preferably less than about 1 micron. The lithium salt, lithium metal oxide or mixture of lithium salt and metal oxide utilized is mixed with the spinel particles in an amount which is less than or equal to 2.5 mole percent of the spinel particles in the mixture. If the lithium salt, lithium metal oxide or mixture of lithium salt and metal oxide utilized is mixed with the spinel particles in an amount greater than about 2.5 mole percent of the spinel particles, a thicker coating will be produced which will overly reduce the electrochemical capacity of the spinel. The potential for destructive out-gassing also requires that residual carbonate in the protective coating be limited to at least less than 0.05% by weight of the spinel product.

As will be understood by those skilled in the art, other species of lithium salts, lithium metal oxides and metal oxides can be utilized which have different atomic ratios from those set forth above. Also, two or more metal oxides or lithium metal oxides can be utilized.

The spinel particles and the lithium salt, lithium metal oxide or mixture of lithium salt and metal oxide particulate reactant(s) utilized are preferably mixed in a high intensity, low shear mill such as a vibratory ball mill, a vibratory rod mill or the equivalent which does not reduce the size of the spinel particles. It is undesirable to reduce the spinel particle size during the mixing step in the presence of the particulate reactant(s) used in that the size reduction which takes place cannot be controlled. Preferably, the mixing of the spinel particles and particulate reactant(s) is performed in a high intensity, low shear ball mill charged with cylindrical ceramic media. The spinel particles and particulate reactant (s) utilized are preferably mixed for a time period, including discharging the mixture, which does not exceed about 75 minutes.

The heating of the mixture of spinel particles and the particulate reactant(s) utilized can be carried out in a batch mode. That is, the particulate mixture can be placed in an inert container formed of stainless steel, densified ceramic or the like and heated in a box oven, a belt or pusher furnace or the like. Air must be flowed through the reaction chamber to remove moisture, $CO_2$ and other gases while maintaining an oxidizing atmosphere. Due to the insulating properties of the reactant powders, the particulate mixture should be heated to above 575° C. as shown in Table I below. As will be understood, deeper reactant beds will require higher heating temperatures while shallower beds require lower temperatures. A preferred bed depth is less than about 2 inches. At depths above about 2 inches, the product will be over-reacted (little or no protective coating) at the top portion of the bed and under-reacted (residual lithium salt) at the bottom portion of the bed. Such a non-homogenous product will be susceptible to excessive capacity fade and out-gassing during battery operation. Generally, the reaction time is in the range of from about 15 minutes to about 20 hours, preferably less than about 2 hours.

In order to produce a homogenous product, the heating of the mixture of spinel particles and the particulate reactant(s) utilized is preferably carried out in a rotary calciner with a countercurrent air flow passing through the calciner during the heating to insure removal of residual moisture, carbon dioxide gas and the like. As mentioned above, the particulate mixture is generally heated for a time in the range of from about 15 minutes to about 20 hours, preferably for a time of from about 30 minutes to about 45 minutes, at a temperature in the range of from about 350° C. to about 850° C., preferably in the range of from about 550° C. to about 650° C. During the time that the mixture is heated at the above mentioned temperature, the particulate reactant(s) combine with each other and with the spinel particles whereby protective coatings of lithium metal oxide are formed on the spinel particles. Simultaneously, the lithium content of the surface layers of the spinel particles adjacent to the coatings are increased limited amounts as represented by the formula $Li_{1+x}Mn_{2-x}O_4$ wherein x is less than 0.2. The bulk of each particle has a lower lithium content, i.e., a lithium content wherein x is less than 0.15.

Lithium manganite ($Li_2MnO_3$) is the most thermodynamically stable lithium manganese oxide compound and will withstand being heated to a temperature above about 1000° C. without decomposition. However, lithium manganite will react with manganese (III) compounds such as $Mn_2O_3$ and LiMn(III)Mn(IV)$O_4$ at temperatures above about 300° C. Reaction (1) below is an iterative step in the commercial preparation of spine, while reaction (2) describes the fate of the coating of lithium manganite on spinel.

$$2Li_2MnO_3 + 3Mn_2O_3 + 0.5O_2 \rightarrow 4LiMn_2O_4 \quad (1)$$

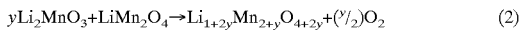

$$yLi_2MnO_3 + LiMn_2O_4 \rightarrow Li_{1+2y}Mn_{2+y}O_{4+2y} + (y/2)O_2 \quad (2)$$

The product of reaction (2) is equivalent to $Li_{1+x}Mn_2O_{4+\delta}$, or alternately, $Li_{1+x}Mn_{2-x}O_4$ if y is less than approximately 0.1. Otherwise, high Li content will lead to tetragonally distorted material that will have poor cycling characteristics. The above reaction shows that a lithium manganite ($Li_2MnO_3$) coating will at least partially react with spinel above a temperature of about 300° C. and produce a lithium-enriched spinel. The longer the treatment time and/or the higher the treatment temperature, the more lithium migration will take place to form particles of uniform composition, rather than particles with just a surface portion enriched in lithium.

The above is confirmed by an analysis of X-ray diffraction data which allows the quantification of the lithium manganite coating formed on spinel. That is, samples of mixtures of spinel particles with particulate lithium carbonate were calcined at different temperatures and times. The calcining at or below 575° C. for 45 minutes did not produce any detectable lithium manganite coating as shown in Table I below. Table I also shows the percent lithium manganite determined by X-ray diffraction Rietveld analysis at various higher temperatures and reaction times.

TABLE I

| Reaction Temperature, ° C. | Reaction Time, minutes | Percent $Li_2MnO_3$ by X-ray Diffraction Analysis |
|---|---|---|
| 575 | 45 | 0.0 |
| 600 | 45 | 0.74 |
| 600 | 60 | 0.77 |
| 600 | 75 | 0.73 |
| 625 | 30 | 1.20 |
| 625 | 45 | 0.92 |
| 625 | 60 | 0.97 |
| 625 | 75 | 0.82 |

As shown in Table I, when the coating treatment was performed at 600° C., approximately 0.75% lithium manganite was formed on the spinel independent of whether the spinel was heated for 45 minutes or 75 minutes. At 625° C., 1.2% lithium manganite was formed after heating for only 30 minutes. That percentage was reduced upon continued heating and the spinel diffraction pattern shifted to greater scattering angle (2θ), indicating a decrease in the lattice constant as a result of lithium manganite reacting to form a lithium-rich spinel. The spinel lattice constant of $Li_{1.07}Mn_{1.93}O_4$ typically shrinks from approximately 8.227 Angstroms to 8.218–8.223 Angstroms during the treatment. The above described treatments were carried out in a static oven. Similar results from treatments carried out in a rotary kiln were obtained at temperatures 20° C. to 50° C. lower.

Referring to FIG. 1, a graph is presented showing the decrease in lattice constant of the treated spinel as a function of reaction time and temperature. As the lithium manganite reacts with the spinel and lithium diffuses through the spinel particles, the lattice constant of the particles shrinks. The rate of lattice shrinkage is a function of the temperature since lithium will diffuse more rapidly as the temperature increases. If lithium manganite and spinel were mixed at the molecular level, there would be no time factor in the lattice contraction. Further, the lithium diffusion kinetics allows a temperature and a time period to be selected that will optimize the economics of the treatment. As illustrated in FIG. 1, it is possible to perform the treatment at 300° C., but the preparation time required for a viable product would be very expensive. Alternately, if the temperature exceeds approximately 625° C., lithium diffusion would proceed too rapidly to control and the product would be less than optimum.

The above discussion concerning lithium manganite protective coatings holds true for any other lithium metal oxide that is battery-inactive, i.e., the metal cannot be further oxidized at a voltage below 4.5 volts. If a coating is placed on the spinel particles that is battery-active, lithium will be extracted and reinserted during normal battery operation and the resulting contraction and expansion will cause the coating to loosen and crack, thereby negating its effectiveness as an acid barrier. The battery-inactive lithium metal oxide coatings formed on the spinel particles in accordance with this invention are typically ceramic in nature and resist dissolution by acid under normal conditions. Thus, the protective coatings of this invention remain on the spinel particles during battery operation and storage even at elevated temperatures.

Thus, a potential drawback of the treatment method of this invention is that there can be a significant loss in maximum capacity when excessive lithium is added to the spinel, specifically when x in the formula $Li_{1+x}Mn_{2-x}O_4$ is greater than 0.2. Accordingly, it is critical in accordance with the present invention that an encapsulating protective layer of battery-inactive lithium metal oxide be added to the spinel particles. Too much lithium added to the spinel will cause excessive formation of ceramic-like lithium metal oxide resulting in poor lithium mobility and unacceptable battery performance. If the lithium metal oxide and spinel are allowed to react for an extended period, the spinel structure will distort and cathodic stability and performance will be diminished.

Even when an appropriate amount of lithium is added to the spinel, the reaction period may be too lengthy or too hot, allowing lithium to diffuse into the interior of the spinel particles thereby losing the coating effect. Spinel treated in a manner where the coating effect is lost will have lattice constants reduced by about 0.01 to about 0.02 Angstroms, and will exhibit a reduction of 10 to 25 percent in reversible discharge capacity. While the capacity fade will be approximately 0.05% per cycle which is a very desirable value, the initial capacity will be less than optimum. Further, if the treatment temperature exceeds approximately 920° C., there will be an irreversible phase change to the unacceptable tetragonal structure which exhibits very poor cathode performance. Lastly, if the temperature reduction after heating is too abrupt, the spinel oxygen deficiency caused by the treatment will not be reversed. Oxygen-deficient spinel species are inferior cathode materials to spinels with correct oxygen stoichiometry. Thus, the process conditions set forth above for heating the particulate mixture of spinel and lithium salt must be followed. In addition, the cooling of the heated and reacted particulate mixture to a temperature below 200° C. must be carried out in a time period in the range of from about 10 to about 60 minutes, preferably in less than about 25 minutes.

After the treated spinel particles are cooled, the particles are cleaned and sized. That is, because the lithium salt utilized may cause flaking (spalling) of the iron containing alloy that forms the calciner, iron containing metallic particles will be present in the product. In addition, the lithium salts may cause minor agglomeration of the particulate product. In order to remove the particles containing iron and oversized particles from the treated product, the treated product particles are subjected to magnetic separation such as by causing the product particles to flow through a column containing multiple magnets which remove the particles containing iron from the particulate product. In addition, the particulate product is caused to pass through a 150 mesh or smaller screen.

A preferred method of this invention of treating particles of spinel having the formula $Li_{1+x}Mn_{2-x}O_4$ ($0.02 \leq x \leq 0.15$) to produce a protective coating of battery-inactive lithium metal oxide on the particles is comprised of the following steps:

(a) mixing the spinel particles with a particulate reactant selected from a lithium salt, a lithium metal oxide or a mixture of a lithium salt and a metal oxide; and (b) heating the resulting particulate mixture for a time in the range of from about 15 minutes to about 20 hours at a temperature in the range of from about 350° C. to about 850° C. to thereby react the spinel particles with the reactant whereby protective coatings of battery-inactive lithium metal oxide are formed on the spinel particles and the lithium contents of the spinel particles adjacent to the coatings are increased limited amounts as represented by the formula $Li_{1+x}Mn_{2-x}O_4$ wherein x is less than 0.2.

Another preferred method of this invention of treating particles of spinel having the formula $Li_{1+x}Mn_{2-x}O_4$ ($0.02 \leq x \leq 0.15$) to produce a protective coating of battery-inactive lithium metal oxide on the particles is comprised of the following steps:

(a) mixing the spinel particles with a particulate reactant selected from a lithium salt, a lithium metal oxide or a mixture of a lithium salt and a metal oxide in a high intensity, low shear mixer;

(b) heating the resulting particulate mixture for a time in the range of from about 15 minutes to about 20 hours at a temperature in the range of form about 350° C. to about 850° C. to thereby react the spinel particles with the reactant whereby protective coatings of battery-inactive lithium metal oxide are formed on the spinel particles and the lithium contents of the spinel particles adjacent to the coatings are increased limited amounts as represented by the formula $Li_{1+x}Mn_{2-x}O_4$ wherein x is less than 0.2;

(c) cooling the resulting heated and reacted particulate mixture to a temperature below 200° C. in a time period in the range of from about 10 to about 120 minutes; and (d) cleaning and sizing the resulting reacted and cooled particulate mixture by removing metallic particles from said mixture and removing oversize particles by passing said mixture through a 150 mesh or smaller screen.

In order to further illustrate the stabilized spinel battery cathode material and methods of this invention, the following examples are given.

EXAMPLE 1

Electrolytic manganese dioxide (EMD) of two different particle sizes were converted to lithium manganite ($Li_2MnO_3$) by reacting equimolar amounts of lithium carbonate and the EMD at 650° C. The two resultant lithium manganite lots had 0.9 micron and 3.8 microns mean particle sizes, respectively, designated as fine and super-fine $Li_2MnO_3$, respectively. Each lot was separately mixed with spinel having the formula $Li_{1.07}Mn_{1.93}O_4$ from a commercial lot at two addition levels of 1.5% by weight of the mixture and 2.37% by weight of the mixture, respectively. The mixtures were each incorporated into a battery cathode and cycle tested in a laboratory coin cell battery. The results of these tests are set forth in Table II below as Tests Nos. 3 and 4. As shown, no improvement over the starting spinel material (Test No. 1 in Table II) was noted.

EXAMPLE 2

Test portions of the mixtures from Example 1 were heated to 575° C. for 30 minutes. X-ray diffraction analysis of the spinel products revealed a modest decrease in the spinel crystal lattice constant, indicating a migration of lithium from the lithium manganite into the spinel. The resulting products comprised of spinel particles coated with lithium manganite are listed in Tests Nos. 5–8 set forth in Table II below. The lithium manganite content was determined by Rietveld analysis of XRD diffraction scans.

TABLE II

| Test No. | Decription of Cathode Material | $Li_2MnO_3$ Content, % by XRD | Maximum Discharge | Fade Rate, %/cycle |
|---|---|---|---|---|
| 1 | Precursor spinel $Li_{1.07}Mn_{1.93}O_4$ | 0 | 123.8 | −0.147 |
| 2 | Spinel treated with 1.5% $Li_2CO_3$ | 1.2 | 114.8 | −0.11 |

TABLE II-continued

| Test No. | Decription of Cathode Material | $Li_2MnO_3$ Content, % by XRD | Maximum Discharge | Fade Rate, %/cycle |
|---|---|---|---|---|
| 3 | Spinel mixed with 1.5% super-fine $Li_2MnO_3$ | 2.4 | 122.6 | −0.16 |
| 4 | Spinel mixed with 2.37% super-fine $Li_2MnO_3$ | 7.4 | 123.3 | −0.175 |
| 5 | Spinel treated with 1.5% super-fine $Li_2MnO_3$ | 0.5 | 115.9 | −0.08 |
| 6 | Spinel treated with 2.37% super-fine $Li_2MnO_3$ | 2.5 | 114.2 | −0.12 |
| 7 | Spinel treated with 1.5% fine $Li_2MnO_3$ | 2.0 | 121.7 | −0.12 |
| 8 | Spinel treated with 2.37% fine $Li_2MnO_3$ | 2.6 | 118.3 | −0.12 |

The electrochemical test results given in Table II above were obtained by incorporating the test materials given in Table II into battery cathodes and cycle testing the cathodes in laboratory coin cell batteries at 55° C. The maximum discharge capacities of the cathodes and fade rates during charge/discharge cycling are given in Table II. As shown in Table II, when lithium manganite ($Li_2MnO_3$) having an average particle size of 0.9 microns was the lithium source (Tests Nos. 5 and 6), the maximum discharge capacity was 8% to 10% less than that of the precursor spinel having the formula $Li_{1.07}Mn_{1.93}O_4$ (Test No. 1), while fade rates improved 15% to 40%. When the lithium manganite having a particle size of 3.8 microns was used (Tests Nos. 7 and 8), approximately 5% capacity loss and 15% fade rate improvement were observed. This particle size effect is consistent with the poor mobility of lithium manganite, even at elevated temperatures. The physical mixtures of spinel and lithium manganite (Tests Nos. 3 and 4) showed no measurable improvement over the precursor spinel alone (Test No. 1).

EXAMPLE 3

27.52 grams of $Li_2CO_3$, 100 grams of $Mn_2O_3$ and 7.04 grams of $Al_2O_3$ were mixed together and calcined at 750° C. for 16.7 hours. The resulting calcined mixture was cooled, re-mixed in a blender and re-calcined at 750° C. for 16.7 hours. X-ray diffraction analysis revealed a $LiMn_2O_4$ spinel pattern with a lattice constant of 8.207 Å and with small peaks from $LiAl_5O_8$ spinel. The produced cathode material calculated as $Li_{1.046}Al_{0.195}Mn_{1.759}O_4$ was cycle tested in a laboratory coin cell battery at 55° C. The maximum discharge capacity of the cathode material was 109 mAh/g and the fade rate was 0.058% per cycle. It is believed that the immobile $LiAl_5O_8$ is a surface species on the LMO spinel particles. Similarly prepared $LiAl_{0.2}Mn_{1.8}O_4$ cathode material exhibited a lattice constant of 8.227 Å and an unacceptable capacity of only 55 mAh/g. Extensive $Al_2O_3$ was detected in the sample.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved method of treating particles of spinel having the formula $Li_{1+x}Mn_{2-x}O_4$ ($0.02 \leq x \leq 0.15$) to produce a protective coating of battery-inactive lithium metal oxide on the particles comprising the steps of:

(a) mixing said spinel particles with a particulate reactant selected from the group consisting of a lithium salt, a lithium metal oxide and a mixture of a lithium salt and a metal oxide; and (b) heating the resulting particulate mixture for a time in the range of from about 15 minutes to about 20 hours at a temperature in the range of from about 350° C. to about 850° C. to thereby react said spinel particles with said reactant whereby protective coatings of battery-inactive lithium metal oxide are formed on said spinel particles and the lithium contents of the interior of said spinel particles adjacent to said coatings are increased by only limited amounts as represented by the formula $Li_{1+x}Mn_{2-x}O_4$ wherein x is less than 0.2.

2. The method of claim 1 wherein said particulate lithium salt reactant is selected from the group consisting of lithium carbonate, lithium hydroxide, lithium nitrate, lithium salts of organic acids and mixtures thereof.

3. The method of claim 1 wherein said particulate lithium metal oxide reactant is selected from the group consisting of $Li_2MnO_3$, $LiScO_2$, $LiYO_2$, $Li_2ZrO_3$, $Li_2HfO_3$, $LiAl_5O_2$, $LiAlO_8$, $LiGaO_2$, $LiLaO_2$, $Li_2SiO_3$, $Li_4SiO_4$, $Li_2GeO_3$ and mixtures thereof.

4. The method of claim 1 wherein said particulate metal oxide reactant is selected from the group consisting of $Sc_2O_3$, $Y_2O_3$, $ZrO_2$, $HfO_2$, $Al_2O_3$, $Ga_2O_3$, $La_2O_3$, $SiO_2$, $GeO_3$ and mixtures thereof.

5. The method of claim 1 wherein said particulate reactant is mixed with said spinel particles in an amount which is less than or equal to 2.5 mole percent of said spinel particles in said mixture.

6. The method of claim 1 wherein said particulate lithium salt reactant has an average particle size less than about 10 microns and about 100% passes through a 150 mesh screen.

7. The method of claim 1 wherein said lithium metal oxide and said metal oxide reactants have average particle sizes less than about 5 microns.

8. The method of claim 7 wherein said spinel particles and particulate reactant are mixed for a time period including discharging the mixture which does not exceed about 75 minutes.

9. The method of claim 1 wherein said spinel particles have an average size of less than about 35 microns and about 100% passes through a 200 mesh screen.

10. The method of claim 1 wherein said spinel particles and said particulate reactant are mixed in accordance with step (a) in a high intensity, low shear vibratory ball mill or the equivalent which does not reduce the size of said spinel particles.

11. The method of claim 1 which further comprises the step of cooling said heated and reacted particulate mixture to a temperature below 200° C. in a time period in the range of from about 10 to about 120 minutes.

12. The method of claim 11 which further comprises the steps of cleaning and sizing said reacted and cooled particulate mixture by removing metallic particles from said mixture and removing oversize particles by passing said mixture through a 150 mesh or smaller screen.

13. A particulate stabilized spinel battery cathode material having a protective coating of lithium metal oxide thereon produced in accordance with the method of claim 1.

14. An improved method of treating particles of spinel battery cathode material having the formula $Li_{1+x}Mn_{2-x}O_4$ ($0.02 \leq x \leq 0.15$) to produce a protective coating of battery-inactive lithium metal oxide on the particles comprising the steps of:

(a) mixing said spinel particles with a particulate reactant selected from the group consisting of a lithium salt, a lithium metal oxide and mixture of a lithium salt and a metal oxide in a high intensity, low shear mixer;

(b) heating the resulting particulate mixture for a time in the range of from about 15 minutes to about 20 hours at a temperature in the range of from about 350° C. to about 850° C. to thereby react said spinel particles with said reactant whereby protective coatings of battery inactive lithium metal oxide are formed on said spinel particles and the lithium contents of the interior of said spinel particles adjacent to said coatings are increased by only limited amounts as represented by the formula $Li_{1+x}Mn_{2-x}O_4$ wherein x is less than 0.2;

(c) cooling the resulting heated and reacted particulate mixture to a temperature below 200° C. in a time period in the range of from about 10 to about 120 minutes; and (d) cleaning and sizing the resulting reacted and cooled particulate mixture by removing metallic particles from said mixture and removing oversize particles by passing said mixture through a 150 mesh or smaller screen.

15. The method of claim 14 wherein said particulate lithium salt is selected from the group consisting of lithium carbonate, lithium hydroxide, lithium nitrate, lithium salts of organic acids and mixtures thereof.

16. The method of claim 14 wherein said particulate lithium metal oxide reactant is selected from the group consisting of $Li_2MnO_3$, $LiScO_2$, $LiYO_2$, $Li_2ZrO_3$, $Li_2HfO_3$, $LiAlO_2$, $LiAlO_8$, $LiGaO_2$, $LiLaO_2$, $Li_2SiO_3$, $Li_4SiO_4$, $Li_2GeO_3$ and mixtures thereof.

17. The method of claim 14 wherein said particulate metal oxide reactant is selected from the group consisting of $Sc_2O_3$, $Y_2O_3$, $ZrO_2$, $HfO_2$, $Al_2O_3$, $Ga_2O_3$, $La_2O_3$, $SiO_2$, $GeO_3$ and mixtures thereof.

18. The method of claim 14 wherein said particulate reactant is mixed with said spinel particles in an amount which is less than or equal to 2.5 mole percent of said spinel particles in said mixture.

19. The method of claim 14 wherein said particulate lithium salt reactant has an average particle size less than about 10 microns and about 100% passes through a 150 mesh screen.

20. The method of claim 14 wherein said spinel particles have an average size less than about 35 microns and about 100% passes through a 200 mesh screen.

21. The method of claim 14 wherein said lithium metal oxide and said metal oxide reactants have average particle sizes less than about 5 microns.

22. The method of claim 14 wherein said spinel particles and said particulate reactant are mixed in accordance with step (a) in a high intensity, low shear vibratory ball mill or the equivalent which does not reduce the size of said spinel particles.

23. The method of claim 22 wherein said spinel particles and particulate reactant are mixed for a time period including discharging the mixed mixture which does not exceed about 75 minutes.

24. A particulate stabilized spinel battery cathode material having a protective coating of lithium metal oxide thereon produced in accordance with the method of claim 14.

* * * * *

UNITED STATES PATENT AND TRADEMARK OFFICE
CERTIFICATE OF CORRECTION

PATENT NO.   : 6,558,844 B2
DATED        : May 6, 2003
INVENTOR(S)  : Wilmont F. Howard, Jr. et al.

It is certified that error appears in the above-identified patent and that said Letters Patent is hereby corrected as shown below:

Column 4,
Line 55, after the word "reactant" add -- (s) --
Line 56, delete "(s)"

Column 5,
Line 42, delete "spine" and substitute -- spinel -- therefor
Line 48, after the equation "$Li_{1+x}Mn_2O_{4+}$" add -- $\delta$ --
Line 48, delete "$\delta$"

Column 10,
Line 20, delete "$LiAl_5O_2$" and substitute -- $LiAlO_2$ -- therefor
Line 21, delete "$LiAlO_8$" and substitute -- $LiAl_5O_8$ -- therefor Column 11,
Line 28, delete "$LiAlO_8$" and substitute -- $LiAl_5O_8$ -- therefor Signed and Sealed this Ninth Day of September, 2003

JAMES E. ROGAN
*Director of the United States Patent and Trademark Office*